United States Patent [15] 3,696,701
Readyhough [45] Oct. 10, 1972

[54] NAIL HAVING A PAIR OF OUTWARDLY DIVERGING HEAD ELEMENTS SHAPED TO PROVIDE PACKAGING, DRIVING AND FASTENING EFFECTIVENESS AND PACKAGE THEREOF

[72] Inventor: Peter A. Readyhough, Barrington, R.I.

[73] Assignee: Textron Inc., Providence, R.I.

[22] Filed: Dec. 29, 1969

[21] Appl. No.: 888,383

[52] U.S. Cl..................................85/28, 206/56 D
[51] Int. Cl..............................................F16b 15/02
[58] Field of Search............85/28, 29, 18, 17, 10, 53, 85/9, 45, 11; 206/56 D

[56] References Cited

UNITED STATES PATENTS

| 319,602 | 6/1885 | Morford | 85/29 |
|---|---|---|---|
| 2,468,821 | 5/1949 | Goodstein | 85/17 |
| 2,913,204 | 11/1959 | Stewart | 85/11 |
| 3,507,384 | 4/1970 | Lippitt | 85/11 |
| 2,111,404 | 3/1938 | Pankonin | 206/56 D |
| 2,940,081 | 6/1960 | Juilfs | 85/28 |
| 3,082,425 | 3/1963 | Leslie | 206/56 D |
| 3,083,369 | 4/1963 | Peterson | 206/56 D |
| 3,152,334 | 10/1964 | Lingle | 85/28 |
| 3,162,871 | 12/1964 | Powers | 206/56 D |
| 3,463,304 | 8/1969 | Gallee et al. | 206/56 D |
| 3,481,459 | 12/1969 | Becht | 85/28 |

FOREIGN PATENTS OR APPLICATIONS

| 272,143 | 6/1927 | Great Britain | 85/28 |
|---|---|---|---|
| 8,348 | 7/1902 | Great Britain | 85/11 |
| 271,161 | 1/1930 | Italy | 85/21 |
| 24,908 | 11/1898 | Great Britain | 85/53 |
| 719,874 | 11/1931 | France | 85/28 |
| 930,844 | 8/1955 | Germany | 206/56 D |

Primary Examiner—Marion Parsons, Jr.
Attorney—Cushman, Darby & Cushman

[57] ABSTRACT

A nail constructed with a pair of head elements extending outwardly from one end of an elongated shank in diverging relation with respect to each other. The head elements are shaped to permit a multiplicity of such nails to be packaged in correspondingly head oriented parallel relation with the shanks of adjacent nails disposed in substantial abutting engagement and preferably with the head elements of adjacent nails in at least partial coextensive relation. The head elements are also shaped so that when the nail is driven into a workpiece at least a portion of the head elements will extend across the grain of a wood workpiece irrespective of the orientation of the head elements with respect to the workpiece. The head elements are also shaped so that the nail can be driven from a package of such nails within a fastener driving tool in such a way that guiding contact with the shank can be maintained at three annularly spaced locations thereabout so that movement in all four transverse component directions can be controlled substantially throughout the longitudinal driving movement of the nail and the driving movement can be accomplished by a fastener driving element having a size and shape at least equal to the shank and disposed in alignment therewith without head interference from the next adjacent nail of the package.

4 Claims, 3 Drawing Figures

PATENTED OCT 10 1972 3,696,701

INVENTOR
PETER A. READYHOUGH

BY Cushman, Darby & Cushman
ATTORNEYS

NAIL HAVING A PAIR OF OUTWARDLY DIVERGING HEAD ELEMENTS SHAPED TO PROVIDE PACKAGING, DRIVING AND FASTENING EFFECTIVENESS AND PACKAGE THEREOF

This invention relates to nails and more particularly to nails of the type adapted to be packaged for handling and loading within a magazine of a fastener driving device so as to be driven in response to the actuation of such device and to the packaging of such nails.

The construction of nails is an old and well-known art. Various suggested standards for the construction of nails have been proposed for many years. Over the years there have been many devices proposed with the capability of driving successive nails from a magazine containing a supply of nails. Within the last several decades devices of this type have received considerable commercial acceptance. Some devices of this type have magazine constructions which are capable of handling the supply of nails in loose bulk form. In general, however, the more commercially acceptable portable devices of this type have magazine constructions which are capable of accommodating a supply of nails only when packaged in a predetermined configuration, such as straight sticks or coils.

In general, the nails embodied in such packages are constructed in accordance with long existing standards. Nails constructed in accordance with these standards impose certain limitations upon the nature of the package itself, the equipment used in forming the package, and the nail driving device within which the package is to be used.

In general, two types of nails have been commercially packaged for use in fastener driving devices. One, round head nails; and two, T nails. Each of these two general types of nail constructions has different advantages and disadvantages in terms of the effectiveness of the package, the fastening effectiveness when driven, and the effectiveness of the driving action within the nail driving tool. In general, it can be stated that T nails can be more effectively packaged than round head nails but suffer in comparison with round head nails in terms of fastening effectiveness. While both T nails and round head nails have disadvantages from a standpoint of driving effectiveness within a fastener driving tool, T nails are somewhat more effective in their driving action than round head nails.

From the standpoint of packaging, the reason a T nail is more effective than a round head nail is that a much more dense package of T nails can be constructed than is the case with round head nails. This is because T nails can be aligned in row formation with their shanks in parallel abutting relation without head interference. Round head nails when positioned in parallel row formation must have their shanks spaced apart a distance sufficient to accommodate the outwardly extending circular head. The ability to position T nails in shank-to-shank abutting relation not only provides for optimum package density but permits simpler and more economical securement of the nails into the package. For example, T nails can be packaged in straight stick formation in a manner similar to staple sticks so that they can be maintained in such formation merely by the application of a suitable adhesive. On the other hand, where the shanks must be spaced apart to accommodate head clearance as with round head nails, not only is the density of the package diminished but considerable more difficulty is encountered in securing the shanks in spaced relation in a package.

These packaging disadvantages of full round head nails have not been completely overcome. There are generally two types of round head nail packages commercially available: one, straight stick packages; and two, coil packages. In straight stick packages the full round head nails are usually positioned in a row formation with their shanks in parallel formation and with the leading portion of each head overlapping the trailing portion of the adjacent head. With this relationship, the density of the package is reduced by as much as one-half or more with respect to a comparable T nail package. Likewise, the problem of securing the nails in this relationship have not been entirely solved. One method of securement involves the utilization of a plastic adhesive material, such as polyvinyl chloride, in the spaces between the nails, but this method of securement suffers from the disadvantage of the necessity to dispose of too much waste material during the driving action. Another method of securement is to utilize two adhesive tape strips on opposite sides of the row formation which contact the shanks tangentially. This method alleviates the waste problem somewhat but suffers from the disadvantage of insufficient holding ability, particularly during the driving action, resulting in nail misalignment and jamming conditions.

A coiled round head nail package is even less dense on a per unit length basis than a straight stick round head nail package for the reason that the heads are usually disposed in alignment, rather than being overlapped. However, the density problem is alleviated somewhat by the coiled configuration of the package. Nevertheless, the problems of package securement are increased and considerable cost and maintenance in the tool results from the necessity of a much more complex magazine assembly for handling and feeding the coil package within the tool.

Notwithstanding the packaging problems which are presented with respect to round head nails, there is a considerably greater usage of these packages than T nail packages ostensibly for the reason that a full round head has a much more favorable holding or fastening effectiveness in a wider range of applications than the straight head of a T nail. While perhaps the difference in the holding effectiveness attributable to a round head configuration in comparison with a straight T nail head configuration is overemphasized and has no practical existence in many applications, nevertheless, in some applications a difference in fastening effectiveness does exist. There are many factors other than head configuration which are determinative of the fastening effectiveness of any given nail. Nails are essentially used to secure two workpieces together and are usually driven through the first workpiece and into the second. The relative thickness of the first workpiece and the depth of penetration into the second with respect to the shank length is a highly critical factor in determining the fastening effectiveness of a nail. By providing shank surface configurations which are unsmooth or by providing shank coatings on smooth shanks the effectiveness of the shanks themselves to secure the two workpieces together can be greatly enhanced. The holding capabilities of the head of the nail becomes a more important factor in the fastening effectiveness as the thickness of the first workpiece decreases. Where the first workpiece is a relatively thin wooden board or the like, the position of the head of a T nail with respect to the grain of the wood can cause quite a variation in the fastening effectiveness. Where the T nail head is aligned with the gram, not only the tendency for pull through is increased, but there is a much greater tendency for splitting to occur. On the other hand, where the head of a T nail extends across the grain there is considerably less tendency for pull through and splitting. Of course, since there are no grain alignment problems with respect to round head nails, the holding effectiveness of such nails does not vary with respect to orientation. Thus, to this extent a round head nail can be regarded as providing a greater fastening effectiveness than a T nail.

There have been many proposals to construct a nail so as to have the packaging advantages of a T nail and at the same time retain to a considerable extent the fastening effectiveness of a round head nail. In general, these proposals have involved eliminating a side portion of the full round head so as to permit a multiplicity of such nails to be packaged in shank-to-shank abutting relation. The initial proposals were to simply provide a notch in the round head of a size appropriate to accommodate the shank therein. In later designs, the entire portion of one side of the round head was cut off along a straight line forming in essence a D shaped nail. Such proposals have not received widespread acceptance.

These constructions, as well as conventional T nails and round head nails, all provide disadvantages in terms of the driving effectiveness within the tool. A round head nail probably presents the greatest problem of driving effectiveness for the reason that the drive track of the tool must have a cross-sectional configuration of a size sufficient to accommodate the full round head and consequently it is not possible to provide stationary structure within the guide track which is capable of guidingly contacting the shank during its driving movement. Various movable guiding arrangements have been proposed but such arrangements ultimately have a detrimental effect on the driving action. Where no movable guide arrangement is provided, there exists a distinct possibility that the shank of the nail will become misaligned with the axis of the drive track, thus diminishing the driving effectiveness and giving rise to the possibility of jamming.

The D head nail construction provides some measure of control of the nail shank during the driving movement, specifically by the abutting engagement of the shank of the next adjacent nail. However, it will be noted that the D head nail, like the round head nail, has a drawback in driving effectiveness due to the lapped relation of the head of the next adjacent nail over the head of the nail being driven. Because of this overlapping relationship which extends above a portion of the shank itself, the shape of the driver must be relieved so as to avoid contact with the overlapping head of the next adjacent nail. This circumstance results in the driver impact being applied to the head in an offset relationship with respect to both the head area and the shank axis which diminishes the driving effectiveness. The detrimental effect of misalignment at driver impact has been diminished somewhat by shaping the drive track to cam the nail into alignment during the driving movement. However, this camming action results in less driver to nail head contact area and also gives rise to the possibility of jamming.

The driving effectiveness of a T nail does not present the difficulties of head overlap and provides a measure of shank control during driving which is greater than either the D head or full round head nail. Thus, with a T nail, in addition to the guiding contact of the shank of the next adjacent nail, the drive track can have a stationary structure which guidingly contacts the shank in diametrically opposed relation. However, such two-line guiding contact with the shank does not positively prevent misalignment of the shank in the other two directions.

It is an object of the present invention to provide a nail which, from a packaging standpoint, achieves the advantages of a T nail in terms of density and facility of securement and eliminates the disadvantages in this regard of a round head nail, from a fastening effectiveness standpoint achieves substantially the advantages of a round head nail without the disadvantages of a T nail and from a driving effectiveness standpoint achieves advantages in terms of shank guiding control which can not be obtained either with a T nail or a round head nail.

Another object of the present invention is the provision of a nail capable of achieving all of the advantages mentioned above which, from a driving effectiveness standpoint, achieves the additional advantage of a T nail in terms of shank-to-driver element alignment and eliminates the disadvantage in this regard of a round head or D head nail.

Another object of the present invention is the provision of a nail capable of achieving all of the advantages mentioned above which, from a packaging effectiveness standpoint, achieves the additional advantage of a T nail in terms of versatility of package configuration and eliminates the disadvantages in this regard of a round head or D head nail.

A further object of the present invention is the provision of a nail of the type described which can be economically manufactured on existing nail making equipment with very slight modification and which can be handled economically with simple packaging equipment.

These and other objects of the present invention will become more apparent during the course of the following detailed description and appended claims.

The invention can best be understood with reference to the accompanying drawings wherein illustrative embodiments are shown.

Figure 1:
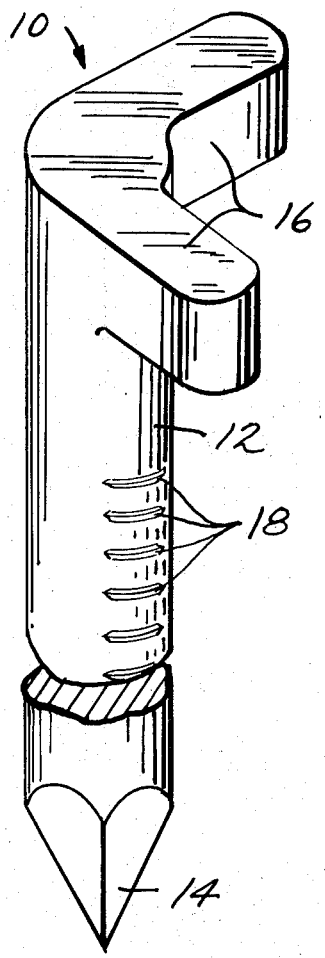
FIG. 1 is a perspective view of the preferred form of nail embodying the principles of the present invention.

Referring now more particularly to FIG. 1 of the drawings, there is shown therein a preferred nail generally indicated at 10, which embodies the principles of the present invention. In general, the nail includes an elongated shank 12, a workpiece entering point 14 formed on one end thereof and a pair of head elements 16 extending outwardly from the opposite end thereof.

As shown, the shank 12 is formed with a smooth cylindrical peripheral surface except for the conventional nail making machine marks, indicated at 18, which preferably are disposed in a position on the shank only beneath the head elements 16. It will be understood, however, that it is within the principles of the present invention to utilize a shank construction which presents a peripheral configuration other than a smooth cylindrical surface. For example, the term substantially cylindrical surface, as herein used, includes a cylindrical surface of the periphery of the shank which is interrupted, as by serrations or the like, to provide for greater holding effectiveness in accordance with conventional practice. In addition, it will be understood that cross-sectional configurations other than circular could be utilized. As shown, the point 14 is of conventional construction and here again, it will be understood that it is within the principles of the present invention to utilize other work penetrating configurations including those of well-known and conventional design. As shown, each of the head elements 16 is of generally straight configuration in plan and extends radially outwardly from the associated end of the shank 12 in an angular relationship with respect to the other of approximately 90°.

It will be understood that various changes in the shape of the head elements and their interrelationship can be made so long as such changes do not depart from certain essential characteristics which are in accordance with the principles of the present invention. These characteristics are considered essential in order to accomplish the objective of providing a nail construction which, from a packaging standpoint, achieves the advantages in terms of density of a T nail and eliminates the disadvantages of a round head nail, from a fastening effectiveness standpoint achieves substantially the advantages of a round head nail without the disadvantages of a T nail and from a driving effectiveness standpoint achieves advantages in terms of shank guiding control which can not be obtained either with a T nail or a round head nail.

These advantages are achieved by virtue of the relationship of the configuration of the head elements to the configuration of the shank and can best be expressed and understood in terms of the projection of the periphery of the head elements in the direction of extent of the shank in relation to the periphery of the shank. Since these three dimensional configurations do not vary substantially in the longitudinal direction, the relationships between the configurations can be conventionally depicted in two dimensional form by viewing the nail construction in plan, as in FIGS. 3.

Figure 3:
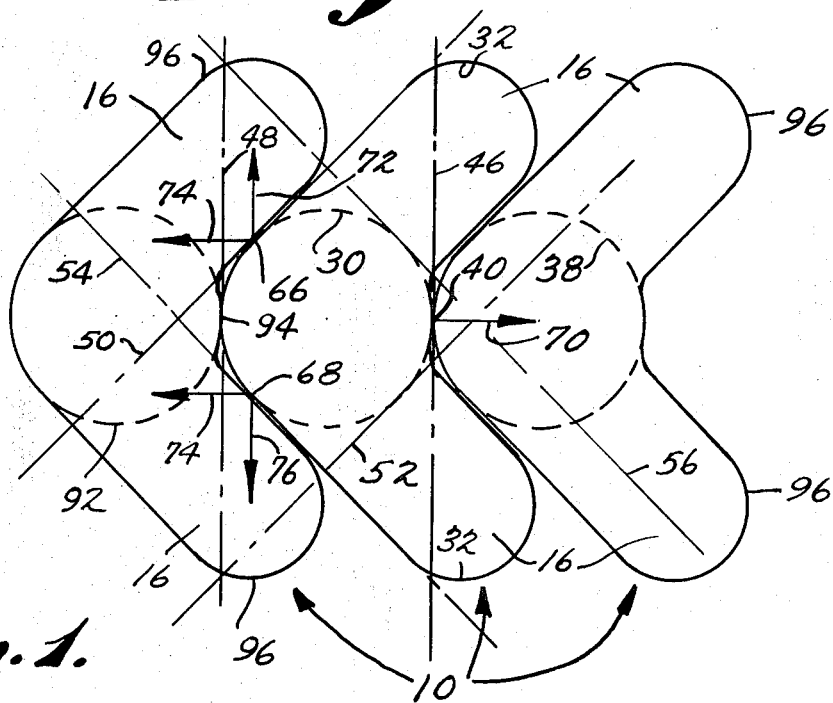
FIG. 3 is an enlarged fragmentary top plan view taken along the line 3—3 of FIG. 2.

With reference to FIG. 3 and more particularly to the middle nail 10 shown therein, the periphery of the shank 12 is represented by the partially broken circular line indicated at 30. The projection of the periphery of the head elements 16 is represented by the two solid lines indicated at 32 which are disposed outwardly of the circular line 30.

Package effectiveness is achieved by maintaining the projection of the periphery of the head elements outside of an endless plane of a size and shape equal to the size and shape of the shank periphery, which endless plane is disposed in substantial parallel abutting engagement with the periphery of the shank substantially along a longitudinal line contained within the plane of the shank periphery. With reference to FIG. 3 and more particularly to the right hand nail 10 shown therein, the above-mentioned endless plane is represented by the partially broken circular line indicated at 38 and the above-mentioned longitudinal line is represented by the point indicated at 40.

Figure 2:
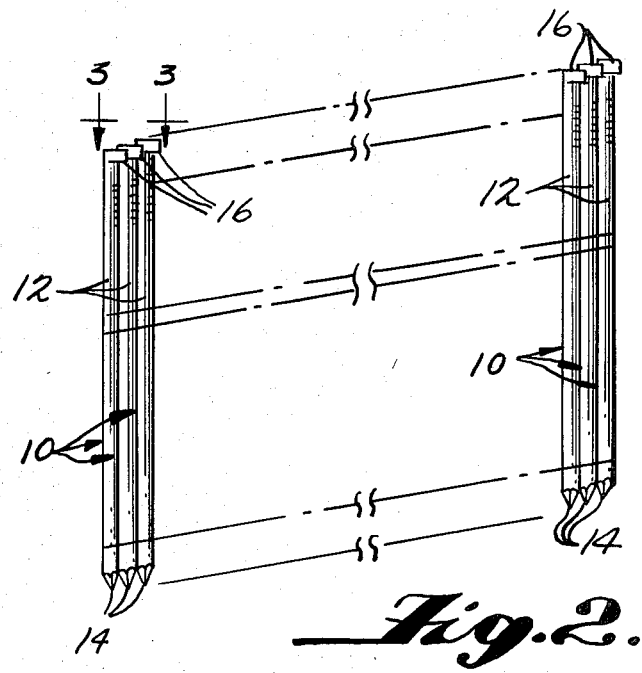
FIG. 2 is a side elevational view of a preferred nail package embodying a multiplicity of nails constructed as illustrated in FIG. 1.

This relationship insures that a multiplicity of nails embodying the present construction can be disposed in correspondingly head oriented parallel relation with the shanks of adjacent nails in substantial abutting engagement as shown in FIG. 2, thereby providing a package effectiveness both in terms of density and facility of securement which is equal to that provided by T nails and eliminating the disadvantages in this regard presented by round head nails.

Fastening effectiveness is achieved by maintaining the aforesaid projection at least partially outside of any two parallel planes tangential to the periphery of the shank. Again, referring to FIG. 3, there is shown therein three exemplary parallel planes which are represented by parallel lines. As shown, a first pair of parallel lines is indicated at 46 and 48, the line 46 containing the point 40 previously described. A second exemplary pair of lines is indicated at 50 and 52, the line 50 being in alignment with a portion of one of the projection lines 32. The third pair of exemplary lines is indicated at 54 and 56, the line 54 being in alignment with a portion of the other projection line 32.

As is evident from FIG. 3, this relationship insures that the head elements, when engaged with a workpiece, will have at least a portion thereof which extends outside an area defined by two such parallel planes oriented in any particular direction with respect to the workpiece, such as in the direction of the grain in a wood workpiece, irrespective of the orientation of the head elements with respect to the workpiece. Thus, the tendency for head pull-through and splitting resulting from head-grain alignment, as with a T nail, is eliminated.

Driving effectiveness is obtained by maintaining the aforesaid projection of the head elements outside of a plurality of additional longitudinal lines contained within the plane of the shank periphery, which additional longitudinal lines are disposed in circumferentially spaced relation with respect to each other and with respect to the first-mentioned longitudinal line (represented by point 40) such that a plurality of straight planes, each containing one of the longitudinal lines and disposed tangentially to the periphery of the shank presents outwardly facing surfaces having directional components in all four directions.

Again, referring to FIG. 3, there are two such longitudinal lines represented by the two points indicated at 66 and 68. The above-mentioned flat planes are represented by the lines 46, 50 and 54 which contain respectively points 40, 66 and 68. The above-mentioned directional components are represented by directional arrows pointing in four different directions indicated by the numerals 70, 72, 74 and 76, the directional arrow 70 extending to the right hand being associated with the point 40 and line 6, the directional arrow 72 extending upwardly and being associated with the point 66 and line 50, the directional arrow 76 extending downwardly and being associated with the point 68 and line 54, the latter together with point 66 and line 50 both having associated therewith a directional arrow 74 which extends to the left.

As can be seen from FIG 3, this relationship insures that when the nail is impacted and driven longitudinally outwardly of the drive track of the tool, the drive track can have stationary longitudinally extending surfaces for guidingly engaging the periphery of the shank at positions corresponding to the longitudinal lines during such driving movement. The guiding engagement of these stationary drive track surfaces together with the guiding engagement of the shank of the next adjacent nail insure guiding control of the shank in all four component directions substantially throughout the entire driving movement of the nail outwardly of the drive track, thus positively eliminating misalignment and the jamming problems which may result therefrom.

In addition to the above-mentioned essential characteristics, it will be noted that the nail 10 achieves, from a driving effectiveness standpoint, the additional advantage of a T nail in terms of shank-to-driver element alignment and eliminates the disadvantages in this regard of a round head or D head nail.

In accordance with the principles of the present invention, the additional driving effectiveness is achieved by maintaining the shape of the head elements such that the aforesaid projection lies outside of a second endless plane of a size and shape equal to the aforesaid endless plane (represented by partially broken circular line 38) and shank periphery, which second endless plane is disposed in substantial parallel abutting engagement with the periphery of the shank substantially along a longitudinal line contained within the plane of the shank periphery which is in opposite alignment with respect to the first-mentioned longitudinal line (represented by the point 40). With reference to FIG. 3 and particularly the left-hand nail 10 shown therein, the second endless plane mentioned above is represented by the partially broken circular line indicated at 92 and the longitudinal line is represented by the point indicated at 94.

It can thus be seen that by considering the left-hand nail illustrated in both FIG. 3 as being disposed within the drive track, the head elements of the next adjacent nail would not physically prevent downward access to the nail head within the drive track by a fastener driving element which is concentric with and of a size equal to the shank periphery. Moreover, the fastener driving element can have a cross-sectional shape which will contact the two head elements 16 so that driver-to-head contact is maintained substantially throughout the area of the head. This fastener driving element shape insures that there will be adequate strength built into the driver thus minimizing the possibility of driver failure. Consequently, the non-overlapping head relationship achieves this advantage in terms of shank-to-driver element contact area and alignment which can be achieved with a T nail and eliminates the disadvantage in driving effectiveness in this regard of round head or D head nails where the overlapping relationship of the head of the next adjacent nail necessitates nail shank-to-driver element misalignment.

Referring now again to FIG. 3, it will be noted that the form of nail 10 includes a further preferred relationship which achieves the additional advantage of a T nail in terms of versatility of package configuration and eliminates the disadvantages in this regard of round head or D head nails.

The additional packaging effectiveness is achieved by insuring that the aforesaid projection of the head elements 16 lies outside of a pair of planes corresponding in size and shape to the projection, which pair of planes is related to the aforesaid first and second endless planes (represented by the partially broken circular lines 38 and 92) in the same relationship as the projection (represented by the lines 32) is related to the shank periphery (represented by the partially broken circular line 30). In FIG. 3 the above-mentioned pair of planes is represented by the lines forming the profile of the head elements of the left and right-hand nails 10 as indicated at 98.

As can be seen from FIG. 3, this relationship insures that a plurality of nails constructed in accordance with the principles of the present invention can be packaged in shank-to-shank abutting relationship with the head elements 16 thereof disposed in coextensive relationship or in partially coextensive relationship with a stepped relationship less than that necessarily resulting from a full overlapping relationship.

In FIG. 2 the stepped relationship of the head elements is such as to form a row of nails which extends upwardly and rearwardly at an angle of approximately 10° with respect to the horizontal. In this regard, the 10° angle of the package shown in FIG. 2 is regarded to be most desirable in that an accommodating magazine structure provides a desirable horizontal relief while minimizing the overall height of the tool design. It will be understood, however, with respect to the package shown in FIG. 2, that the relationship mentioned above would permit packaging with a full coextensive relationship between the head elements or with a full lapped relationship.

The nail package shown in FIG. 5 is of the straight stick type and the nails can be retained in the relationship shown by any suitable means. As shown, an adhesive material such as that conventionally employed in adhering staples in stick formation is utilized as the securing means. While the nails of the present invention have particular advantages when packaged in straight stick formation, it will be understood that they are equally susceptible to being packaged in other forms as, for example, in coils or the like utilizing other securing means. In this regard, see for example U.S. Pat. No. 3,083,369 dated Apr. 2, 1963. With respect to coil packages, the preferred nail construction 10 would permit coiling of the nails with their shanks spaced in substantially closer relation with respect to each other than the full round head nails illustrated in the coil of the aforementioned patent. By providing appropriate relief in the head element configuration, a coil package with the shanks in abutting relation and head elements in coextensive relation could be formed.

With the above in mind, it will be understood that the shape of the head elements and the shape of the shank periphery is susceptible to considerable variation in accordance with the principles of the present invention. The straight configuration of the head elements shown in the drawings and described above is preferred for the reason that this shape can most conveniently be produced by existing nail making equipment with very little modifications. The width of each head element adjacent the shank is preferably made as great as possible within the parameters described above, taking into account manufacturing tolerances. The limitations of existing nail making equipment also determine to a considerable extent the preferred thickness and length of the head elements as shown. That is, in existing nail making equipment, the head elements are formed by cold flow of the metal forming the upper part of the shank and the amount of metal which can be effectively made to cold flow is limited. Consequently, where the advantages of using slightly modified existing nail making equipment are achieved the straight filletted configuration with the maximum lengths and thicknesses shown is preferred.

It is recognized, however, that nail making machines which are not so inherently limited could be developed to form head elements with curved or angular profiles which embody the principles of the present invention. In general, however, it can be stated that the strength of each head element is determined to a considerable extent by the amount of metal contained therein at its juncture with the shank, so that an outwardly increasing width or thickness would not provide any appreciable increase in the head holding ability of the nail.

A nail embodying the principles of the present invention has the advantages mentioned above throughout the full size range, the advantages being particularly desirable in the larger size nails.

For example, a 16d nail embodying the principles of the present invention can have a smaller shank diameter than a standard 16d common nail, since it is power driven and the shank is controlled throughout the power driven movement. Thus, it is not necessary to build in strength in the shank which will resist bending under the action of a hand-held hammer. The holding ability of the nail, even though of smaller shank diameter, can be made equally effective either by interrupting the smooth cylindrical surface or preferably by providing a coating thereon. Significant savings in material costs can thus be obtained by the nail of the present invention, particularly the larger sizes.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. A nail comprising a length of metal wire defining a substantially cylindrical elongated shank having a first end portion formed into a workpiece entering construction and a second end portion formed by cold flow of metal into a head construction consisting of a pair of head elements extending transversely outwardly from said shank in diverging relation with respect to each other, the periphery of said head elements when projected in a direction parallel to the longitudinal extent of said shank lying outside of an endless plane of a size and shape equal to the size and shape of the periphery of said shank and disposed in substantial parallel abutting engagement with the periphery of said shank substantially along a first longitudinal line contained within the plane of the periphery of said shank so as to permit said nail to be packaged with a multiplicity of similar nails in correspondingly head oriented parallel relation with the shanks of adjacent nails disposed in substantial abutting engagement, said projection lying at least partially outside of any two parallel planes tangential to the exterior periphery of said shank so as to insure engagement of said head elements with a workpiece into which said nail is driven outside an area defined by such parallel planes oriented in a particular direction with respect to said workpiece, such as in the direction of the grain in a wood workpiece, irrespective of the orientation of said head elements with respect to said workpiece, said projection lying outside of a pair of second longitudinal lines contained within the plane of the periphery of said shank disposed in circumferentially spaced relation with respect to each other and with respect to said first longitudinal line such that a pair of flat planes each containing one of said longitudinal lines and disposed tangentially to the periphery of said shank present outwardly facing surfaces having directional components in all four directions so that said nail can be impacted on the second end portion thereof and driven longitudinally outwardly of a drive track presenting longitudinally extending surfaces for guidingly engaging the periphery of said shank at positions corresponding to said second longitudinal lines during such driving moment, said projection lying outside of a second endless plane of a size and shape equal to said first-mentioned endless plane and being disposed in substantial parallel abutting engagement with the periphery of said shank substantially along a longitudinal line contained within the plane of the periphery of said shank which is in opposite alignment with respect to said first longitudinal line so as to permit said nail to be impacted and driven by a fastener driving element which is in longitudinal alignment with and of a size equal to the periphery of said shank without interference from the head elements of an adjacent similar nail of the aforesaid multiplicity when packaged as aforesaid, said projection lying outside of a pair of planes corresponding in size and shape to said projection and related to said first and second endless planes in the same relationship as said projection is related to the periphery of said shank so as to permit the aforesaid multiplicity of nails to be packaged in the aforesaid relation with the head elements of adjacent nails disposed in coextensive relation.

2. A nail as defined in claim 1 wherein said pair of head elements extend radially outwardly from said shank in an angular relationship with respect to each other of approximately 90°.

3. A multiplicity of nails as defined in claim 1 arrange in correspondingly head oriented parallel relation with the shanks of adjacent nails in substantial abutting engagement and the heads of adjacent nails in at least partially coextensive relation and means for retaining said multiplicity of nails in said arrangement.

4. A multiplicity of nails as defined in claim 3 wherein said arrangement extends in straight row formation upwardly and rearwardly at an angle of approximately 10°.

* * * * *